United States Patent [19]

Horikawa et al.

[11] Patent Number: 5,338,070
[45] Date of Patent: Aug. 16, 1994

[54] DIAMETER-REDUCING MEMBER JOINT DEVICE

[75] Inventors: Hiroshi Horikawa; Yoshikazu Tsuzuki; Hisashi Mogi; Kazuo Matsubara, all of Yokohama, Japan

[73] Assignee: Furukawa Electric Co., Ltd., Tokyo, Japan

[21] Appl. No.: 738,351

[22] Filed: Jul. 31, 1991

[51] Int. Cl.$^5$ .............................................. F16L 55/17
[52] U.S. Cl. ...................................... 285/177; 285/15; 285/381
[58] Field of Search ................... 285/15, 177, 381, 286

[56] References Cited

U.S. PATENT DOCUMENTS

| | | | |
|---|---|---|---|
| 351,263 | 10/1886 | Hemphill | 285/381 |
| 2,624,598 | 1/1953 | Quinlan | 285/177 |
| 3,711,628 | 1/1973 | Hansson | 285/287 X |
| 3,936,080 | 2/1976 | Bennett | 285/175 |
| 3,958,817 | 5/1976 | Marsh, Sr. | 285/175 X |
| 4,070,044 | 1/1978 | Carrow | 285/381 |
| 4,161,273 | 7/1979 | Jeffers | 285/286 |
| 4,396,213 | 8/1983 | Hawkins | 285/287 |
| 4,514,244 | 4/1985 | Shaeder et al. | 285/177 |
| 4,832,382 | 5/1989 | Kapgan | 285/381 |
| 4,872,713 | 10/1989 | Kapgan | 285/381 |

FOREIGN PATENT DOCUMENTS

| | | | |
|---|---|---|---|
| 324139 | 12/1902 | France | 285/177 |
| 0879101 | 2/1943 | France | 285/177 |
| 1147654 | 11/1957 | France | 285/177 |
| 0163843 | 5/1921 | United Kingdom | 285/177 |
| 0230957 | 3/1925 | United Kingdom | 285/177 |

*Primary Examiner*—Randolph A. Reese
*Assistant Examiner*—Heather Chun
*Attorney, Agent, or Firm*—Thomas R. Morrison; Harold L. Burstyn

[57] ABSTRACT

The present invention discloses a diameter-reducing member joint device, where connecting a first member to be connected as the boss of a flange joint or composed of relatively large-diameter pipes to a second member to be connected and having an outer diameter smaller than that of the first member, characterized by interposing a diameter-reducing pipe joint, which has at one end a large-diameter connection portion connected to the first member and also at the other end a small-diameter connection portion connected to the second member, between the first and second members to be connected, and by using a ring-like or cylindrical heat-shrinkable member made of a heat-shrinkable type of shape memory alloy. Namely, the large-diameter connection portion of the diameter-reducing pipe joint and the first member are connected to each other by tightening up due to the shape recovery force when the heat-shrinkable member is thermally shrunken, and the small-diameter connection portion at the other end of the diameter-reducing pipe joint is connected to the second member in a similar manner, so that the first member having a large diameter is connected to the second member and having an outer diameter smaller than that of the first member in a simple and reliable manner.

3 Claims, 5 Drawing Sheets

DIAMETER-REDUCING MEMBER JOINT DEVICE

BACKGROUND OF THE INVENTION

1. Field of the Invention

This invention, in general, relates to a diameter-reducing member joint device, and more particularly to a diameter-reducing member joint device suitable to both the repair when the connection portion connected to a flange joint is broken and the mutual connection between the diameter-reducing pipes and for using a heat-shrinkable cylinder made of a shape memory alloy for the connection of at least a large-diameter portion.

The present invention also relates to a diameter-reducing member joint device suitable for use where the safety and reliability at a high level are required in such a joint device, for example, the pipeline joint devices in various nuclear power plants and chemical plants.

2. Description of the Prior Art

Figure 10:
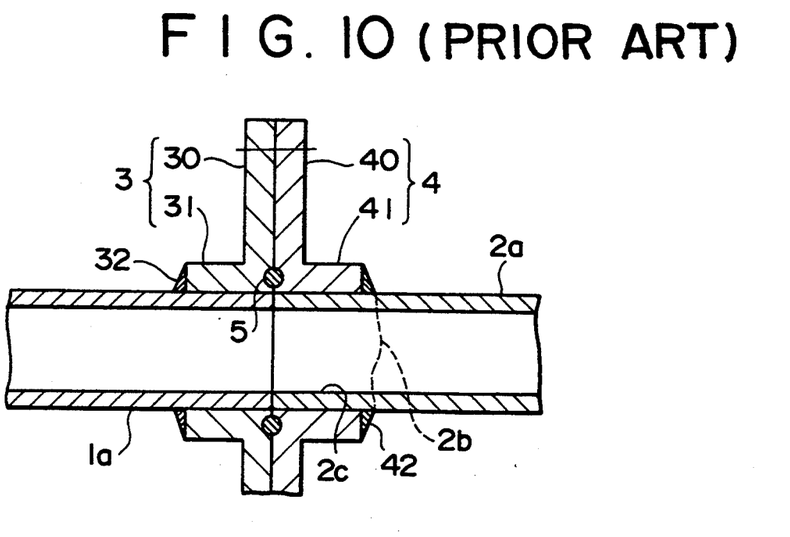
FIG. 10 is a partial cross-sectional view showing the condition for mutually connecting pipes by using a conventional and general flange joint.

In general, the joint structure flange joints connects mutually pipes 1, 2, as shown in FIG. 10, by inserting the end portions of pipes 1a, 2a to be connected into flange joints 3, 4 composed of flanges 30, 40 and bosses 31, 41 projecting into one surface of the flanges 30, 40 from the direction of the bosses 31, 41, respectively, by adhering the top end portions of the bosses 31, 41 in the flange joints 3, 4 to the surface portions of the pipes 1a, 2a to be connected by welds 32, 42, respectively, and by tightening mutually the flanges 30, 40 with unshown bolts and nuts through O-ring 5.

In the joint structure shown in FIG. 10, the neighboring portions around the welds 32, 42 as the end bases of the flange joints 3, 4 and the pipes 1a, 2a are most fragile, and the pipes 1a, 2a in the neighborhood of the welds 32, 42 easily get cracks 2b or are broken. Repair when the pipe 2a gets the cracks 2b and the pipe 2a is broken are difficult because they take a very long time and require expert skill for example, for taking out a residual portion 2c of a pipe 2 within the flange joint 4 by removing the bead of the weld 42 and for needing the joint legs by welding to the pipe 2a shortened by separating the residual portion 2c.

In general, when the diameter-reducing pipes are connected to each other, the end portions of both pipes are also welded to a diameter-reducing pipe joint while the diameter-reducing pipe joint is placed between the end portions of the diameter-reducing pipe. However, such a connecting operation not only takes a long time, but also the repair operation at the breakage time of a welded portion between the diameter-reducing pipe joint and either of the pipes is very difficult as abovementioned.

Furthermore, Japanese Patent Laid-open No. 50-93847 (U.S. patent application Ser. No. 404723 and No. 404724 on the date of Oct. 9, 1973, respectively) has disclosed a joint device for connecting a couple of pipes by pressing a metallic liner with its slightly larger diameter than that of the pipes to be connected against the pipe portion to be connected from an external direction due to the shape recovery force in its shrinkable direction resulting from heating a heat-shrinkable cylinder made of a shape memory alloy up to its shape recovery temperature to be shrunken, after the liner is inserted the heat-shrinkable cylinder and the mutual end portions of the pipes are inserted into the liner from both ends. However, any means for connecting the diameter-reducing members with each other by using the heat-shrinkable cylinder made of the shape memory alloy has not yet been proposed.

OBJECTS AND SUMMARY OF THE INVENTION

An object of the present invention is to provide a diameter-reducing member joint device for connecting a flange joint portion to pipes with easy and high reliability in case the pipes are broken at the flange joint portion in a pipeline system and in case a flange joint is provided in the portion of the pipeline system for reinforcement.

Another object of the present invention is to provide a diameter-reducing member joint device for mutually connecting any reducing pipes in a pipeline system with easy and high reliability.

For attaining the preceding objects, a first diameter-reducing member joint device according to the present invention comprises a diameter-reducing pipe joint having a short cylindrical and large-diameter connection portion, into which a first member to be connected is inserted, at one end and also having a short cylindrical and small-diameter connection portion, to which a second member to be connected having a diameter smaller than that of the first member to be connected is connected, at the other end, and a heat-shrinkable member made of a shape memory alloy and pressing the large-diameter connection portion against the first member to be connected from an external direction due to its shape recovery force.

According to this first joint device, the large-diameter connection portion of the diameter-reducing pipe joint is inserted into the internal portion of the heat-shrinkable member, and the end portion of the first member to be connected is inserted into this large-diameter connection portion. Then, when the heat-shrinkable member is heated up to a shape recovery end temperature, the shape of the heat-shrinkable member is recovered in a shrinkable direction. Accordingly, the large-diameter connection portion is strongly pressed against the first member to be connected, and the large-diameter connection portion is connected to the first member to be connected. Furthermore, by connecting the small-diameter connection portion of the diameter-reducing pipe joint to the second member to be connected by the similar means or another means, the first member to be connected is connected to the second member to be connected by way of the diameter-reducing pipe joint.

For improving the sealing ability between the large-diameter connection portion and the first member to be connected, it is preferable to form one or a plurality of projections continuing in an external direction on the internal surface of the large-diameter connection portion.

A second diameter-reducing member joint device according to the present invention comprises a diameter-reducing pipe joint having a short cylindrical and large-diameter connection portion with the same outer diameter as that of a first member to be connected at one end and also having a short cylindrical and small-diameter connection portion, to which a second member to be connected having a diameter smaller than that of the first member to be connected is connected, at the other end, a large-diameter liner in a sleeve form, into which the first member to be connected and the large-diameter connection portion are inserted, and a heat-shrinkable member made of a shape memory alloy and pressing the large-diameter liner against the first member to be connected and the large-diameter connection portion from an external direction due to its shape recovery force.

According to this second joint device, the large-diameter liner is inserted into the internal portion of the heat-shrinkable member, and the large-diameter connection portion of the diameter-reducing connection portion and the first member to be connected are inserted from both end portions of this large-diameter liner until both end portions and meet each other. After then, then the heat-shrinkable member is heated up to a shape recovery end temperature, the shape of the heat-shrinkable member is recovered in a shrinkable direction. Accordingly, the large-diameter liner is strongly pressed from an external direction against the first member to be connected and the large-diameter connection portion of the diameter-reducing pipe joint inserted into the internal portion of the liner, and the large-diameter connection portion is connected to the first member to be connected. Furthermore, by connecting the small-diameter connection portion of the diameter-reducing pipe joint to the second member to be connected by the similar means or another means, the first member to be connected is connected to the second member to be connected by way of the diameter-reducing pipe joint.

For improving the sealing ability between the large-diameter liner and both the first member to be connected and the large-diameter connection portion, it is preferable to form one or a plurality of projections continuing in an external direction at both sides except the center portion in a longitudinal direction on the internal surface of the large-diameter liner.

In the present invention, the small-diameter connection portion of the diameter-reducing pipe joint and the second member to be connected can be connected with each other by either of the means described in the following.

The first means to connect a small-diameter connection portion to a second member to be connected is by welding by forming the small-diameter connection portion in such an inner diameter so as to be capable of inserting the end portion of the second member to be connected into, and inserting the second member to be connected into the small-diameter connection portion.

The second means to connect the small-diameter connection portion to the second member to be connected is by forming the small-diameter connection portion in such an inner diameter as to be capable of inserting the end portion of the second member to be connected into, and at the same time by providing the heat-shrinkable member made of a shape memory alloy and pressing the small-diameter connection portion against the second member to be connected from an external direction due to its shape recovery force in the small-diameter connection portion, and by heating this heat-shrinkable member up to its shape recovery end temperature to make it shrink.

In this second means, it is preferable to form one or a plurality of projections continuing in an external direction on the internal surface of the small-diameter connection portion for improving the sealing ability in the connection portion between the small-diameter connection portion and the second member to be connected.

The third means to connect the small-diameter connection portion to the second member to-be connected is by forming the small-diameter connection portion in an approximately same outer diameter as that of the second member to be connected, at the same time by providing both a small-diameter liner in a sleeve form, into which the end portion of the second member to be connected is inserted, and the heat-shrinkable member made of a shape memory alloy and pressing the small-diameter liner against the small-diameter connection portion and the second member to be connected from an external direction due to its shape recovery force, and by heating this heat-shrinkable member up to its shape recovery end temperature to make it shrink.

Also in this third means, on the internal surface of the small-diameter liner, it is preferable to form one or several projections continuing in an external direction at both sides other than the center portion in a longitudinal direction, respectively for improving the sealing ability between the small-diameter liner and both the small-diameter connection portion and the second member to be inserted into the internal portion of the liner.

In each joint device according to the present invention, the diameter-reducing pipe joints and each liner are made of the same metal material as that of member to be connected for preventing the corrosion due to the electric potentials between the members in case the joint device is used in the pipeline system where corrosive fluid flows.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
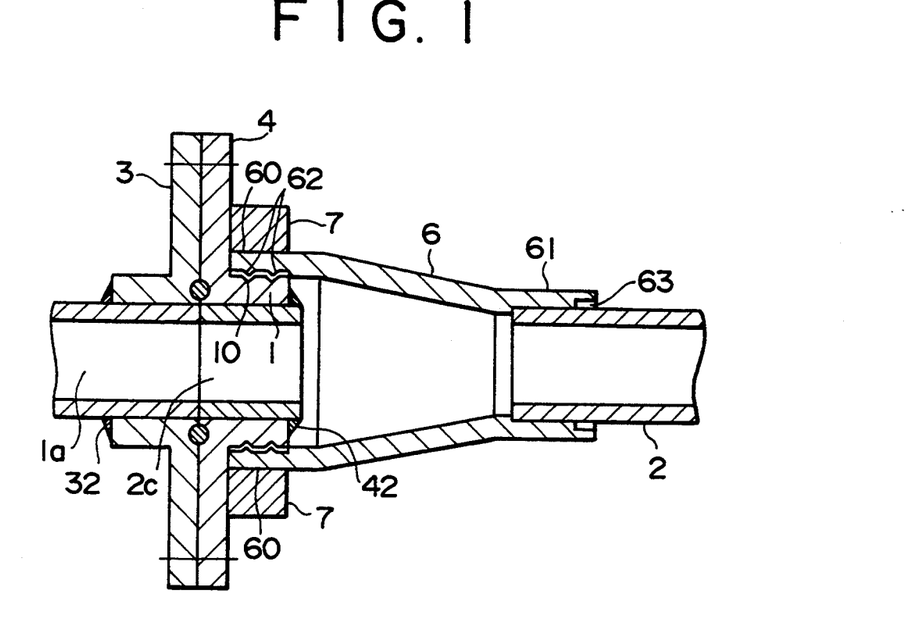
FIG. 1 shows a preferred embodiment of a joint device according to the present invention and is a cross-sectional view showing the condition prior to the mutual connection between the members to be connected.
Figure 2:
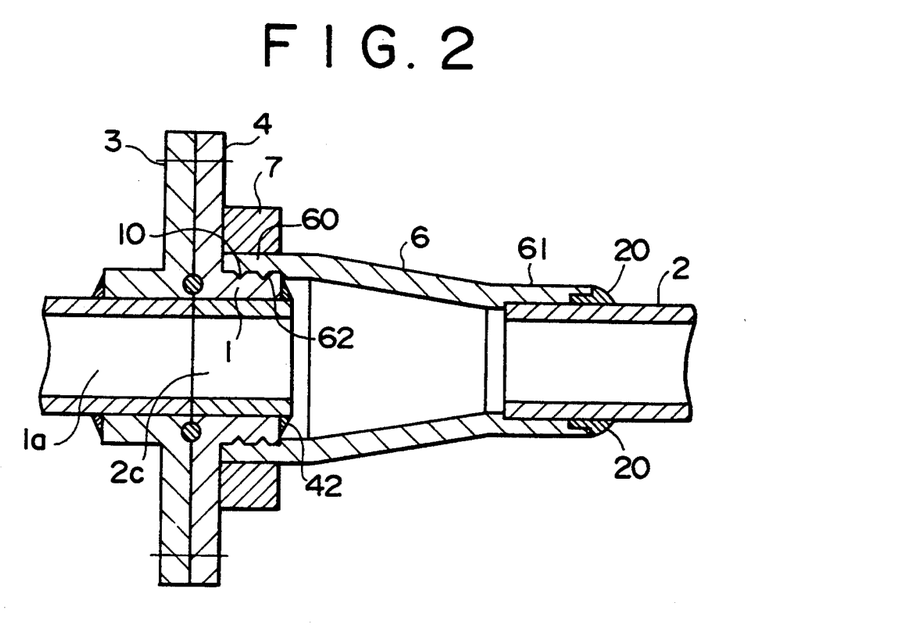
FIG. 2 is a cross-sectional view showing the condition for mutually connecting the members to be connected by the joint device of FIG. 1.

FIGS. 1 and 2 show preferred embodiments where the pipes connected with a flange joint in a pipeline repair a broken portion by a joint device according to the present invention.

Flange joints 3, 4 are made of stainless steel (SUS 304), and a pipe 1a is fixed by a weld 32 to one flange joint 3. A residual portion 2c broken from a second member 2 to be connected is left within the other flange joint 4, and the end portion at the welded side 42 of this residual portion 2c is cut off so as to become flat and smooth. Both of the pipe 1a and the second member 2 to be connected are made of stainless steel (SUS 304) and have their outer diameters of 21.7 mm, respectively.

In the joint device of this preferred embodiment, the boss portion of the flange joint 4 constitutes a first member 1 to be connected, whose outer diameter is 40 mm.

Reference numeral 6 indicates a diameter-reducing pipe joint made of stainless steel (SUS 304). A short cylindrical and large-diameter connection portion 60 with a large bore is formed at one end of the joint 6, and a short cylindrical and small-diameter connection portion 61 with a bore smaller than that of the large-diameter connection portion 60 is formed at the other end thereof, respectively. Two stripe projections 62 continuing in an external direction are formed on the inner circumference of the large-diameter connection portion 60, and a step portion 63 cutting off the inner circumference is formed on the end portion of the small-diameter connection portion 61, while continuing in an external direction.

Reference numeral 7 indicates a heat-shrinkable member molded in a cross-sectional ring form and made of a heat-shrinkable type of shape memory alloy, and the large-diameter connection portion 60 of the diameter-reducing pipe joint 6 is inserted into the internal portion of the heat-shrinkable member 7.

The heating temperature (shape recovery end temperature) required for recovering the shape in the condition of shrinking the heat-shrinkable member 7 and the temperature range for maintaining its shape recovery force are freely set up by the selection of the alloy composition and the optical of processing conditions when the heat-shrinkable member 7 is produced.

The heat-shrinkable member 7 in this preferred embodiment employs an alloy of Ni—Ti—Nb type and is 10 mm in thickness. It is added with about 4% through 8% elongation stress in an external direction at room temperature and is processed under the shape recovery end temperature of 150° C. and so as to keep its shape recovery force down to about −30° C.

The diameter-reducing pipe joint 6 of this preferred embodiment, is set up so that both portions of the large-diameter connection portion 60 and the small-diameter connection portion 61 are 2.5 mm in thickness, the other portion is 3 mm in thickness, the projection is 0.5 mm in height, and the circle formed by the corner portions of the projections 62 is 41 mm in diameter, respectively.

In this preferred embodiment, a channel 10 continuing in an external direction so as to correspond to the projections 62 of the large-diameter connection portion 60 is formed on an outer circumference of the first member 1 to be connected, and the diameter of the circle formed by the bottom portion of this channel 10 is set to be 30 mm.

For connecting the first member 1 to be connected to the second member 2 to be connected by this joint device, as shown in the figure, the first member 1 to be connected is inserted into the internal portion of the large-diameter connection portion 60 in the diameter-reducing pipe joint 6, and the heat-shrinkable member 7 is heated up to 150° C. by heating means such as torch gun (not shown). By this heating, as shown in FIG. 2, the heat-shrinkable member 7 is shrunk in a memorized shape, and the projections 62 mesh with the channel 10 to seal the meshed portion by strongly pressing the large-diameter connection portion 60 of the diameter-reducing pipe joint 6 against the external surface of the first member 1 to be connected due to the shape recovery force. Furthermore, the end portion of the second member 2 to be connected is inserted into the small-diameter connection portion 61 of the diameter-reducing pipe joint 6, and as shown in FIG. 2, the step portion 63 of the end portion in the small-diameter connection portion 60 is connected to the second member 2 to be connected by a weld 20.

In this preferred embodiment, the time required for the above-mentioned repair is about 3 through 10 minutes as an average, although it is different depending on the sizes of the joint 6.

The first member 1 to be connected was connected to the second member 2 to be connected in the condition shown in FIG. 2, and a leak test was done by applying an air pressure of 5 kgf/cm² in water on the connected portion. Furthermore, a hydraulic test under the pressure of 100 kgf/cm² was done to examine its pressure proof. In either there was no leakage and a great reliability.

Figure 3:
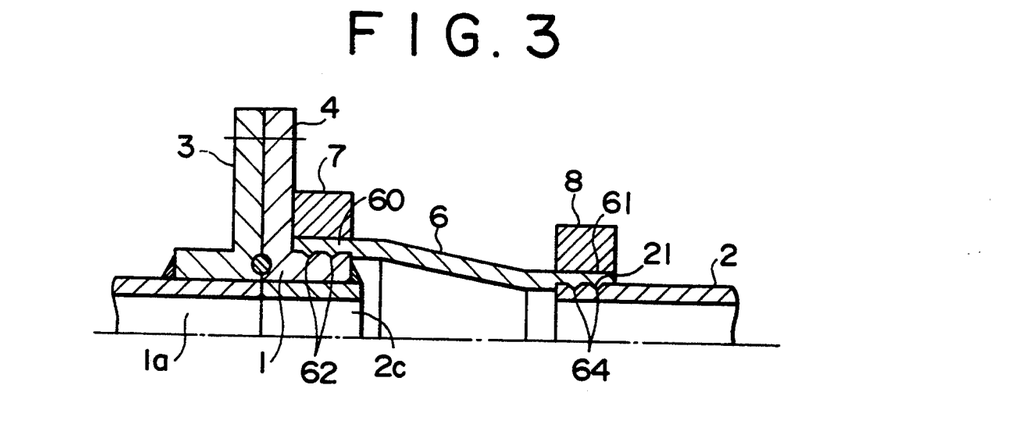
FIG. 3 is a half-cutaway cross-sectional view showing another preferred embodiment of the joint device according to the present invention.

FIG. 3 illustrates an embodiment for connecting the small-diameter connection portion 61 to the second member 2 to be connected, instead of connecting the small-diameter connection portion 61 of the diameter-reducing pipe joint 6 to the second member 2 to be connected by welding as above-mentioned. Namely, the small-diameter connection portion 61 is inserted into a heat-shrinkable member 8 molded in a cross-sectional ring form and made of a heat-shrinkable type of shape memory alloy, the end portion of the second member 2 to be connected is inserted into this small-diameter connection portion 61, then the heat-shrinkable member 8 is heated to shrink in the memorized shape, and the small-diameter connection portion 61 is pressed against the outer circumference of the end portion in the second member 2 to be connected due to the resulting shape recovery force to connect both of them 61, 2 to each other.

In this preferred embodiment, two stripes of projections 64 continuing in an external direction are formed on the inner circumference of the small-diameter connection portion 61, and a channel 21 is also formed on the outer circumference of the end portion in the second member 2 to be connected so as to correspond to each projection 64. When the heat-shrinkable member 8 is not yet heated and shrunken, the diameter of a circle formed by the corner portions of the projections 64 is 22.5 mm, and that of a circle formed by the bottom portion of the channel 21 is 20.9 mm, respectively. The raw material, the thickness, and the shape recovery end temperature of the heat-shrinkable member 8 and the temperature range for maintaining its shape recovery force are the same as those of the heat-shrinkable member 7.

Other structures and operations of the joint device in FIG. 3 are similar to those of the joint device in FIGS. 1 and 2, and their detailed description is omitted.

Figure 4:
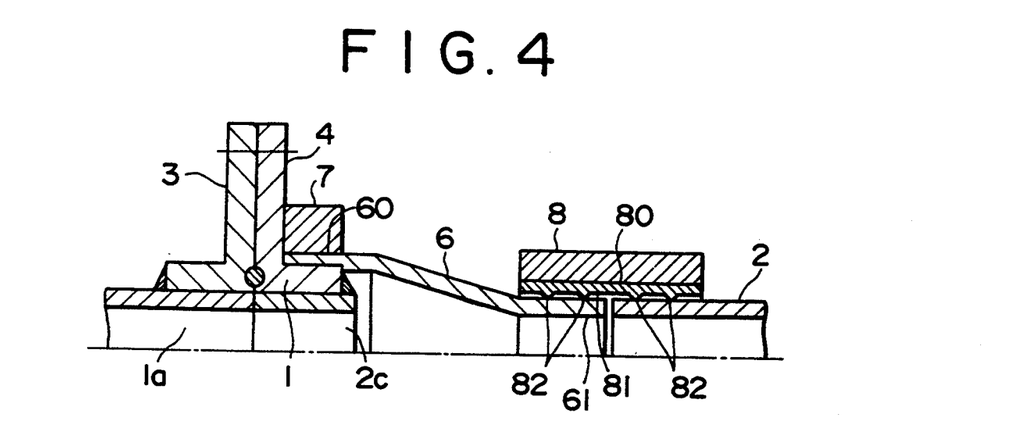
FIG. 4 is a half-cutaway cross-sectional view showing a further preferred embodiment of the joint device according to the present invention.

FIG. 4 shows another preferred embodiment of the means for connecting the small-diameter connection portion 61 of the diameter-reducing pipe joint 6 to the second member 2 to be connected.

In the joint device of FIG. 4, both outer-diameters of the small-diameter connection portion 61 of the diameter-reducing pipe joint 6 and the second member 2 to be connected composed of pipes are set to be 21.7 mm, and the joint device is attached with both a sleeve-like and small-diameter liner 80, into which the small-diameter connection portion 61 and the second member 2 to be connected can be inserted from both sides, and the heat-shrinkable member 8 made of a heat-shrinkable type of shape memory alloy and in a cylindrical form so as to insert this small-diameter liner 80. The liner 80 is made of stainless steel (SUS 304) and is 2 mm in thickness. Two stripes of projections 82 having a height of 0.5 mm and continuing in an external direction are formed at both sides except a center portion 81 on its inner circumference. When the heat-shrinkable member 8 is not yet heated and shrunken, the diameter of a circle formed by the corner portion of each projection 82 is 22.5 mm.

The raw material, the thickness and shape recovery end temperature of the heat-shrinkable member 8 in FIG. 4 and the temperature range for maintaining its shape recovery force are all the same as those of the heat-shrinkable member 7 in the joint device of FIG. 1, and its thickness is 8 mm. The internal portion of the large-diameter connection portion 60 in the diameter-reducing pipe joint 6 and the external surface of the first member 1 to be connected are both smooth, on which any projections and channels are not formed.

According to the joint device in FIG. 4, when the small-diameter connection portion 61 is connected to the second member 2 to be connected, the liner 80 is inserted into the internal portion of the heat-shrinkable member 8, and the small-diameter connection portion 61 and the end portion of the second member 2 to be connected are inserted into the liner 80 from its one end and from the other end, respectively, so as to mutually access or meet with each other at the central portion 81 in a longitudinal direction. After then, the heat-shrinkable member 8 is heated up to its shape recovery end temperature, and the liner 80 is firmly pressed against the small-diameter connection portion 61 and the second member 2 to be connected from an external direction due to the resulting shape recovery force in its shrinkable direction.

When the small-diameter connection portion 61 and the second member 2 to be connected are connected with each other, the corner portions of the respective projection 82 in the liner 80 cut into both surfaces of the small-diameter connection portion 61 and the second member 2 to be connected to seal this portion as shown in FIG. 4.

Other structures and operations of the joint device in FIG. 4 are similar to those of the joint device in FIGS. 1 and 2, and their detailed description is omitted.

Figure 5:
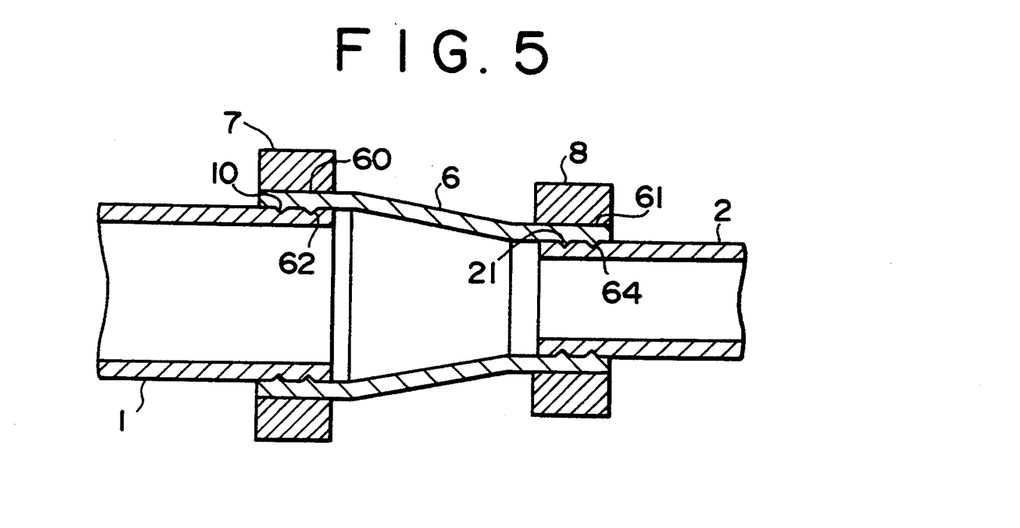
FIG. 5 is a cross-sectional view showing a still further preferred embodiment of the joint device according to the present invention.

FIG. 5 illustrates an embodiment for connecting the first member 1 to be connected composed of the large-diameter pipe by exchange of the first member 1 to be connected composed of the boss of the flange joint 4 in FIG. 3 with a large outer diameter pipe made of stainless steel (SUS 304), to the second member 2 to be connected.

In the joint device of FIG. 5, each portion of the diameter-reducing pipe joint 6 is set up to be 3 mm in thickness, including the large-diameter connection portion 60 and the small-diameter connection portion 61. In similar to the joint device of FIG. 3, the corresponding two stripes of projections 62 and a channel 10 are formed on the internal surface of the large-diameter connection portion 60 and the surface of the first member 1 to be connected, and the corresponding two stripes of projections 64 and a channel 21 are formed on the internal surface of the small-diameter connection portion 61 and the surface of the second member 2 to be connected. As in this joint device, other portions are similar to those in the joint device of FIG. 3, and its operations are also similar to those in the joint device of FIG. 3, their detailed description is omitted.

Figure 6:
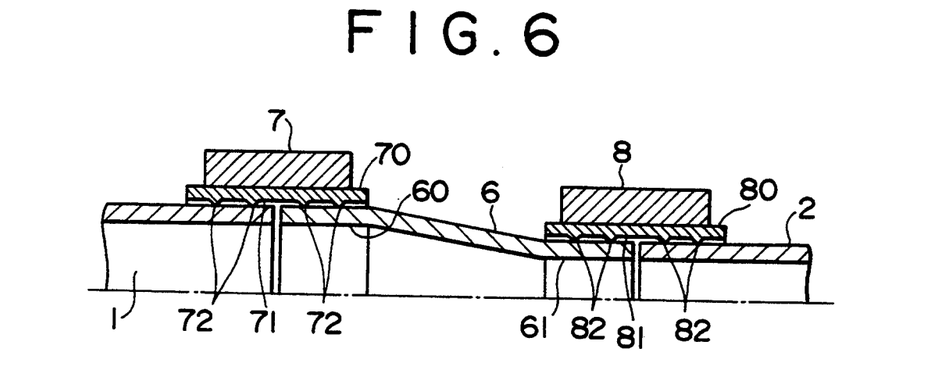
FIG. 6 is a half-cutaway cross-sectional view showing a still further preferred embodiment of the joint device according to the present invention.

FIG. 6 shows a modification of the connecting means between the first member 1 to be connected and the large-diameter connection portion 60 of the diameter-reducing pipe joint 6, and each portion of the diameter-reducing pipe joint 6 made of stainless steel (SUS 304) is produced with the thickness of 3 mm. The short cylindrical and large-diameter connection portion 60 having the same outer diameter (40 mm) as that of the first member 1 to be connected is formed at one end of the joint 6, and the short cylindrical and small-diameter connection portion 61 having the same outer diameter (21.7 mm) as that of the second member 2 to be connected is formed at the other end thereof.

The connection means for the first member 1 to be connected and the large-diameter connection portion 60 is provided with a sleeve-like and large-diameter liner 70, into which the large-diameter connection portion 60 and the first member 1 to be connected can be inserted from both sides, and the heat-shrinkable member 7 made of a heat-shrinkable type of shape memory alloy and in a cylindrical form so that this large-diameter liner 70 can be inserted into. The liner 70 is made of stainless steel (SUS 304) and with the thickness of 2 mm, and two stripes of projections 72 having a height of 0.6 mm and continuing in an external direction are formed on both sides except the center portion 71 in an inner circumference. When the heat-shrinkable member 7 is not yet heated and shrunken, the diameter of a circle formed by the corner portions of the respective projections 72 is 42 mm.

The raw material, and the shape recovery end temperature of the heat-shrinkable member 7 in FIG. 6 and the temperature range for maintaining the shape recovery force are all the same as those of the heat-shrinkable member 7 of the joint device in FIG. 3, and its thickness is 10 mm.

According to the joint device in FIG. 6, when the large-diameter connection portion 60 is connected to the first member 1 to be connected, the liner 70 is inserted into the internal portion of the heat-shrinkable member 7, and the large diameter connection portion 60 and the end portion of the first member 1 to be connected are inserted into the liner 70 from one end and from the other end, respectively, so as to mutually access or meet with each other at the center portion 71 in a longitudinal direction. Then, the heat-shrinkable member 7 is heated up to its shape recovery end temperature, and the liner 70 is strongly pressed against the large-diameter connection portion 60 and the first member 1 to be connected from an external direction due to the resulting shape recovery force in its shrinkable direction.

When the large-diameter connection portion 60 and the first member 1 to be connected are connected with each other, the corner portions of the respective projections 72 in the liner 70 cut into both surfaces of the large-diameter connection portion 60 and the first member 1 to be connected to seal this portion as shown in FIG. 6. The point for connecting the small-diameter connection portion 61 to the second member 2 to be connected is the same as that in case of the joint device in FIG. 4, and therefore, any further description is omitted.

Other structures and operations of the joint device in FIG. 6 are similar to those of the joint device in FIG. 4, and their description is omitted.

The connection means for the first member 1 to be connected and the large-diameter connection portion 60 which are explained in the joint device of FIG. 6 can be applied to the joint device explained in FIGS. 2, 3, 4, 5 and 7, which will be explained in the following.

Figure 7:
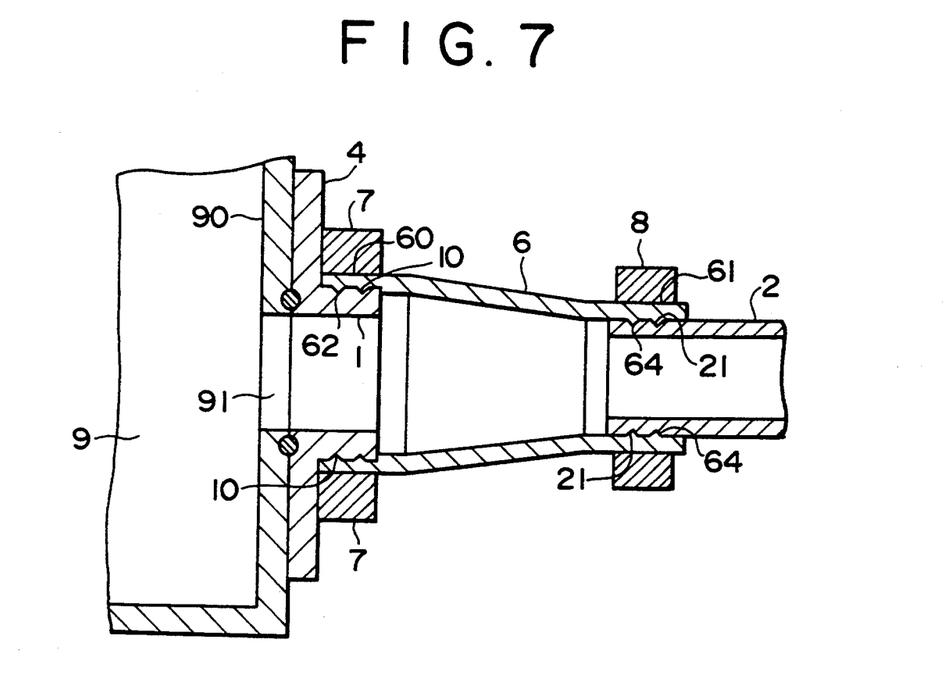
FIG. 7 is a cross-sectional view showing a yet further preferred embodiment of the joint device according to the present invention.

FIG. 7 shows a further preferred embodiment of the joint device according to the present invention. A hole 91 is formed in the side wall of a tank 9 for fluid flowing through a pipeline system, and at the same time, a flange joint 4 is fixed by appropriate means so as to communicate with this hole 91. In the joint device of the preferred embodiment shown in FIG. 7, the boss of the flange joint 4 constitutes the first member 1 to be connected. This first member 1 to be connected is connected to the second member 2 to be connected having an outer diameter smaller than that of this member 1 to be connected by using the diameter-reducing pipe joint 6 and the heat-shrinkable members 7 and 8 with their structure similar to those of the joint device shown in FIG. 3. As their connection points and other specific structures and operations are, the same as those of the joint device in FIG. 3, their description is omitted.

Similar to the joint devices of the preferred embodiments shown in FIGS. 1 and 2, a leak test and a hydraulic test were also applied to the joint devices of the preferred embodiments given in FIGS. 3 through 7. As a result, no leakage could be found and it has been confirmed that their joint devices are very reliable. In addition, the average required time for connecting between the first member 1 to be connected and the second member 2 to be connected is almost same as that of the joint devices in FIGS. 1 and 2.

Figure 7A:
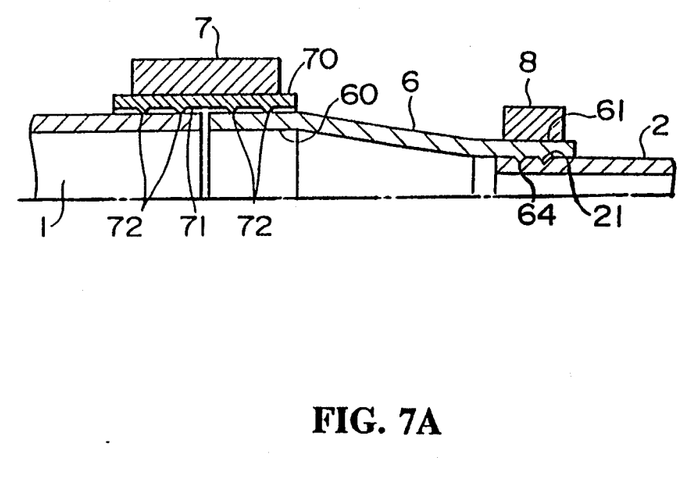
FIG. 7A is a cross-sectional view of still another embodiment of the present invention.
Figure 8:
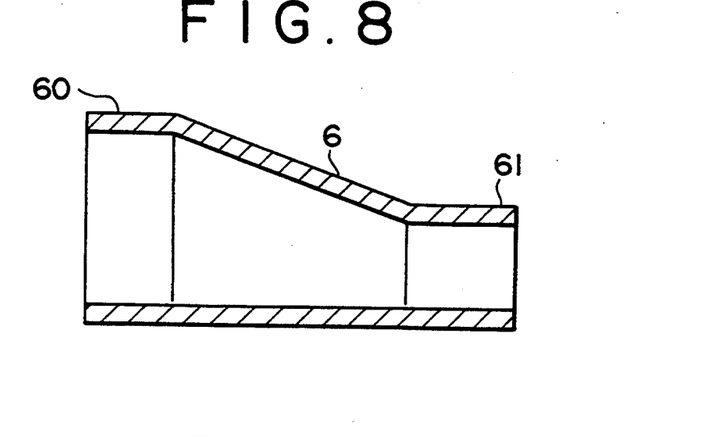
FIGS. 8 and 9 are cross-sectional views showing the modifications of a diameter-reducing pipe joint of the joint device according to the present invention, respectively.
Figure 9:
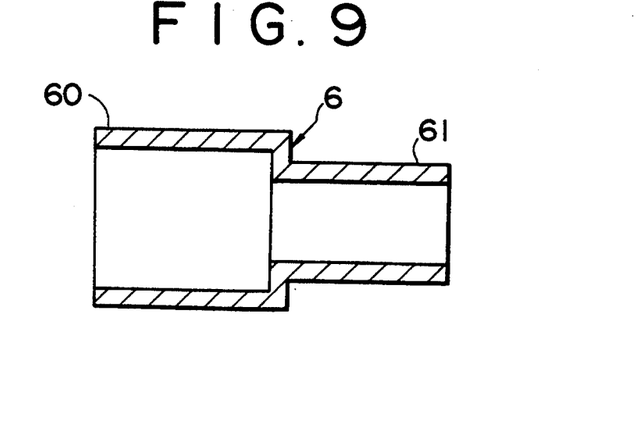

So far as the diameter-reducing pipe joint 6 used in the present invention is equipped with both the large-diameter connection portion 60, into which the first member 1 to be connected can be inserted, at one end and the small-diameter connection portion 61, into which the second member 2 to be connected having a diameter smaller than of the first member 1 to be connected can be inserted, at the other end, the diameter-reducing pipe joint 6 is not restricted to that having a shape as shown in each preferred embodiment as above-described. For instance, the diameter-reducing pipe joints 6 with their shapes shown in FIGS. 8 and 9 can be used for practicing the present invention. Yet another embodiment in FIG. 7A has the diameter-reducing joint 6 with the liner 70 coupling the large diameter portion 60 to a first member 1 and the small diameter portion 61 engaging the second member 2.

Furthermore, although the diameter-reducing member joint device has been disclosed as some examples of the present invention, it is to be understood that various other modifications might be included without restriction to the preferred embodiments, as herein disclosed.

What is claimed is:

1. A diameter reducing member joint device comprising:

a diameter-reducing pipe joint having at one end a short cylindrical and large-diameter connection portion with the same outer diameter as that of a first member to be connected, and also having at the other end a short cylindrical and small-diameter connection portion connected with a second member to be connected and having an outer-diameter smaller than that of said first member to be connected;

a large-diameter liner, into which both said first member to be connected and said large-diameter connection portion are inserted;

a heat-shrinkable member made of a shape memory alloy and pressing said large-diameter liner against said first member to be connected and said large-diameter connection portion from an external direction due to its shape recovery force; and said small-diameter connection having such an inner diameter that the end portion of said second member to be connected is capable of being inserted thereinto, and said small-diameter connection portion being provided with a heat-shrinkable member made of a shape memory alloy pressing said small-diameter connection portion against said second member to be connected from an external direction due to its shape recovery force.

2. A diameter-reducing member joint device according to claim 1, wherein one or a plurality of projections continuing in an external direction are formed on the internal surface of said small-diameter connection portion.

3. A diameter reducing joint device for connecting a first and a second member, according to claim 1, wherein said diameter-reducing pipe joint is composed of a metallic material.

* * * * *